United States Patent Office — 3,431,135 — Patented Mar. 4, 1969

3,431,135
REDUCING FLAME TREATMENT OF POLYETHYLENE TEREPHTHALATE FILM PRIOR TO ALUMINIZING
John J. Keane and John C. Lough, Wilmington, Del., assignors to E. I. du Pont de Nemours and Company, Wilmington, Del., a corporation of Delaware
No Drawing. Continuation-in-part of application Ser. No. 469,317, July 2, 1965. This application June 13, 1966, Ser. No. 556,882
U.S. Cl. 117—46  4 Claims
Int. Cl. C23c 13/02; B32b 15/08

ABSTRACT OF THE DISCLOSURE

Metallized polyethylene terephthalate film produced by first subjecting a surface of the film to a reducing flame, and thereafter depositing on the treated surface a coating of metal, e.g., aluminum, deposited from a vapor of the metal.

---

This application is a continuation-in-part of our copending application Ser. No. 469,317, filed July 2, 1965 now abandoned.

This invention relates to a process for the improvement of the adhesion of vacuum-deposited metal to linear polyester film. More specifically, it relates to the flame treatment of polyethylene terephthalate film to promote the adhesion of vacuum-deposited metal.

Vacuum-deposited metal on organic plastic structures is highly resistant to tarnishing, consequently metallized films find wide utility for decorative purposes. Metallized films are particularly suited for such purposes since they are quite flexible and can be shaped to some extent to conform to various contours. The degree to which such material can be shaped, especially over a small radius, however, is limited by the adhesion of the thin layer of metal to the film. This limitation is a result of the difference between the elastic properties of the metal and the base film; in spite of the very thin cross section of the metal layer (e.g. a few hundred Angstroms) the interfacial forces between the metal and the base may be smaller than the force to elongate the metal. Thus, the elongation of a very small area of the film upon flexing may be sufficient to initiate separation of the metal and the film, an effect which is, among other aspects, apparent as a loss of specular reflection at the point of separation. This mars the appearance and largely destroys the utility of the film.

Furthermore, the metallized film may be laminated to other structures, usually by application of an adhesive to the metal and bonding to the structure with the base film on the exterior. However, when such laminated structures are, in use, subjected to severe impact upon scuffing, it has been found that the strength of the metal-to-film bond is again inadequate, which allows the separation of the film with resultant loss of utility.

Particularly adapted to these applications are oriented films of polyethylene terephthalate. Conventional treatment of these films for adhesion improvement, such as with an electrical discharge, the non-specific flame treatments, ultraviolet irradiation, deposition of surface charges and chemical or solvent treatments are ineffectual.

It is, therefore, an object of the present invention to provide a linear polyester film having enhanced adhesion to vacuum-deposited metal coatings. A more specific object of this invention is to provide a method of producing a metallized, oriented polyethylene terephthalate film having a strongly adhered, vacuum-deposited, coating of aluminum, which film is substantially free of the shortcomings noted above. These and other objectives will appear more clearly from the detailed description which follows.

We have found that when the surface of a linear polyester film is flame-treated with a reducing flame, it acquires a particular affinity for vacuum-deposited metal coatings, i.e., the coating adheres strongly to the polyester substrate, so strongly, in fact, that in many instances the bond strength of coating to treated film is much greater than the tear strength of the film. This is surprising because neutral and oxidizing flames do not afford improved bonding of vacuum-deposited metal coating to the film. Similarly, electrical discharge treatment which, in general, improves the adherence characteristics of plastic surfaces affords no improvement as respects the adhesion of vacuum-deposited metal coatings to polyester film.

Accordingly, the present invention, briefly stated, comprises subjecting a surface of a linear polyester film, e.g. oriented polyethylene terephthalate film, to the action of a reducing flame, and thereafter depositing upon said surface a coating of metal deposited from a vapor of the metal.

A general description of the characteristics of flame and the flame treating process employed in the present invention can be found in U.S. Patent 3,153,683. In the present invention, however, a reducing flame is employed, and by the expression "subjecting a surface to a reducing flame" employed herein, is meant subjecting a film surface to that portion commonly referred to as the reducing cone or the primary envelope of a flame produced by the combustion of a gaseous fuel mixture consisting essentially of oxygen and hydrocarbons in which the oxygen, with nitrogen, as in air, is premixed with the fuel before emerging from the burner orifice, with the quantity of premixed oxygen being insufficient for complete combustion of the gaseous fuel, i.e., the stoichiometric ratio of hydrocarbon to oxygen (fuel equivalence ratio) is greater than 1.0, and is preferably not less than 1.05. Further, in this invention, the surface of the film, was exposed to the flame and was within 2.5 to 3.5 mm. of the burner orifice, which placed it within the reducing cone or inner primary envelope. The air which was premixed with the fuel was enriched with oxygen so that the oxygen ratio was within the range 0.26 to 0.30 (the atmospheric oxygen ratio is 0.21).

While the invention will be hereinafter illustrated using propane as the preferred hydrocarbon, it is to be understood that the process is operable as well with other hydrocarbon gaseous fuels such as butane, ethane, ethylene, and the like, or with a mixture of such gases.

Following the flame treatment outlined above the treated polyester film surface is metal-coated by the known technique of condensing a metal vapor, i.e., aluminum vapor, on the film surface. This operation is customarily carried out in a closed chamber maintained at a suitably reduced pressure.

This invention is particularly adapted to, and will be hereinafter described with specific reference to the metal-coating of biaxially oriented polyethylene terephthalate film which is notoriously difficult to coat with satisfactory coating adherence, and which, as pointed out above does not respond effectually to electrical discharge, the non-specific flame treatments, ultraviolet irradiation, solvent and chemical treatment heretofore employed to improve the surface bonding characteristics of smooth plastic surfaces.

The following examples will serve to illustrate the principles and practice of my invention.

In the following examples a web of 1 mil, biaxially oriented (i.e., stretched 3× in each direction of the film) polyethylene terephthalate film was flame-treated (both sides to prevent any tendency of the film to curl) with a propane-oxygen flame on one surface in conventional flame-treating apparatus shown, for example, in Bryan, U.S. Patent 3,153,683, and the treated surface was thereafter coated to a coating thickness of several hundred Angstroms by passing the film through a low-pressure chamber in which is generated aluminum vapor which condensed as a thin coating (several hundred Angstroms) upon the exposed treated surface of the film. The strength of the film-to-metal bond of the resulting coated film was measured in the following manner:

Measurement of meal-to-film bond strength.—Metal-to-film adhesion is measured by laminating the metallized surface to an 8 mil polyvinyl chloride sheeting using plasticized polyvinylidene chloride as an adhesive. A tear tab is provided on each test sample to permit initiation of a peel. When the metal is thus strongly bonded to the polyvinyl chloride sheeting the lamination will be most apt to fail at the polyester film/metal interface. In many cases, however, the metal-to-film bond will be sufficiently strong that the film will tear rather than peel. The laminate can be made to peel at the polyester film/metal interface by subjecting it to a series of successively higher elongations at the rate of 2 inches per minute on an Instron tester. Eventually an elongation is reached at which the polyester film can be peeled from the metal coating. The elongation at which the film first peels and the force (tensile) required to peel the film at the rate of 12 inches per minute from metal coating provide a measure of the polyester film/metal bond strength.

Table I shows the effect of the character of the flame (propane/oxygen ratio) on the bond strength at the film/metal interface.

electrical discharge treatment is ineffective in improving film-to-metal bond strength.

TABLE II.—ELECTRICAL DISCHARGE TREATMENT
[10 Kc., 23° C.]

| Example No. | Atmos. in Discharge | Watt-min. per sq. in. | Percent Elongation at Tear | Peel Force at 40% Elongation |
|---|---|---|---|---|
| Control | | | 15 | 0.8 |
| 8 | Air | 24 | 20 | 0.85 |
| 9 | Air | 12 | 15 | 0.95 |
| 10 | Air | 6 | 20 | 0.75 |
| 11 | Nitrogen | 24 | 20 | 0.90 |
| 12 | do | 12 | 25 | 1.0 |
| 13 | do | 6 | 25 | 0.9 |
| 14 | do | 3 | 15 | 0.75 |
| 15 | do | [1]24 | 20 | 0.7 |
| 16 | do | [1]12 | 25 | 0.8 |
| 17 | do | [1]6 | 25 | 1.0 |
| 18 | Air | [1]24 | 10 | 0.8 |
| 19 | Air | [1]12 | 15 | 0.7 |
| 20 | Air | [1]6 | 20 | 0.8 |

[1] Back-up roller at 100° C.

The primary advantage of the present invention, of course, is that the process provides a much stronger bond between the metal and the linear polyester film substrate than has previously been attainable. Inherent in the process itself is low cost, the absence of contaminating materials, and the avoidance of additional steps to dry or remove solvents from the film before metallizing.

What is claimed is:
1. The process for producing metallized linear polyester film which comprises passing a surface of a polyethylene terephthalate film through the primary cone of a flame produced by the combustion of a gaseous fuel mixture consisting essentially of oxygen and hydrocarbons, said fuel mixture having a fuel equivalence ratio

TABLE I.—FLAME TREATMENT
[Percent Elongation Before Peel]

| Flame Propane oxygen ratio | | 0% | 10% | 20% Peel Force [1] | 30% Peel Force | 40% Peel Force | 50% Peel Force | 60% Peel Force | 70% Peel Force |
|---|---|---|---|---|---|---|---|---|---|
| Example No.: | | | | | | | | | |
| Control | None | Tore | Tore | 1.1 | 0.9 | 0.8 | 0.5 | 0.4 | |
| 1 | 0.90 (oxidizing) | do | do | 1.1 | 0.8 | 0.6 | 0.3 | 0.3 | |
| 2 | 0.95 (oxidizing) | do | do | 1.0 | 0.8 | 0.6 | 0.4 | 0.3 | |
| 3 | 1.00 (neutral) | do | do | 1.0 | 0.8 | 0.7 | 0.5 | 0.4 | |
| 4 | 1.05 (reducing) | do | do | Tore | Tore | 1.1 | 0.9 | 0.8 | |
| 5 | 1.10 (reducing) | do | do | Tore | Tore | Tore | 1.2 | 1.1 | |
| 6 | 1.15 (reducing) | do | do | Tore | Tore | Tore | Tore | Tore | 1.1 |
| 7 | 1.20 (reducing) | do | do | Tore | Tore | Tore | Tore | Tore | 1.1 |

[1] Pounds per inch width.

It will be apparent from the foregoing tabulation that the bond strength between metal and polyester film is significantly improved when the flame treatment is carried out using a reducing flame, i.e., a flame wherein the fuel to oxygen ratio is greater than unity. Furthermore, this improvement persists after storage at high humidity and temperature; for example, stored at 80% relative humidity, 100° F. for one week after treatment before metallizing effected negligible diminution in the enhancement of bond strength achieved by reducing flame treatment. Likewise, storage under ambient conditions, 70° to 80° F., 40 to 60% relative humidity did not materially diminish the bond strength.

In the following examples, samples of 1 mil, biaxially oriented polyethylene terephthalate film were subjected to electrical discharge treatments under the conditions indicated by passing the film over a grounded metal roll and beneath a bar electrode disposed parallel to the longitudinal roll and uniformly spaced 40 mils therefrom. After treatment the treated surface of the film was vapor coated with aluminum, the metal surface then laminated to an 8 mil polyvinyl chloride film and the polyester film/metal interface bond strength measured, all as described in the previous examples. As shown in Table II, greater than 1.0 and an oxygen ratio within the range of 0.26 to 0.30, and thereafter depositing on said surface a coating of aluminum deposited from a vapor thereof.

2. A metallized linear polyester film produced by the process of claim 1.

3. The process of claim 1 wherein said polyester film is biaxially oriented polyethylene terephthalate film.

4. The process of claim 1 where the fuel equivalence ratio is not less than 1.05.

References Cited

UNITED STATES PATENTS 2,795,820  6/1957  Grow et al. _____ 117—46

FOREIGN PATENTS 570,529  2/1959  Canada.
701,923  1/1965  Canada.

ALFRED L. LEAVITT, Primary Examiner.

HERBERT COHEN, Assistant Examiner.

U.S. Cl. X.R.

117—47, 107, 160; 156—82; 161—214